(12) United States Patent
Savage (10) Patent No.: US 7,570,582 B1
(45) Date of Patent: *Aug. 4, 2009

(54) METHOD AND SYSTEM FOR ROUTING COMMUNICATIONS AMONG COMPUTER NETWORKS

(75) Inventor: Donnie V. Savage, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 589 days.

This patent is subject to a terminal disclaimer.

(21) Appl. No.: 11/374,501

(22) Filed: Mar. 13, 2006

Related U.S. Application Data (63) Continuation of application No. 09/627,248, filed on Jul. 28, 2000, now Pat. No. 7,042,834.

(51) Int. Cl.
*H04L 12/28* (2006.01)
*H04L 12/56* (2006.01)

(52) U.S. Cl. .................. 370/218; 370/244; 370/254; 370/401

(58) Field of Classification Search .............. None
See application file for complete search history.

(56) References Cited

U.S. PATENT DOCUMENTS

| | | | |
|---|---|---|---|
| 5,088,032 A | 2/1992 | Bosack | |
| 5,394,436 A | 2/1995 | Meier et al. | |
| 5,519,704 A | 5/1996 | Farinacci et al. | |
| 5,581,543 A | 12/1996 | Natarajan | |
| 5,633,866 A | 5/1997 | Callon | |
| 5,673,031 A | 9/1997 | Meier | |
| 5,864,666 A | 1/1999 | Shrader | |
| 5,987,521 A | 11/1999 | Arrowood et al. | |
| 6,067,573 A | 5/2000 | Tam et al. | |
| 6,493,349 B1 * | 12/2002 | Casey | 370/409 |
| 6,526,056 B1 * | 2/2003 | Rekhter et al. | 370/392 |
| 6,538,416 B1 * | 3/2003 | Hahne et al. | 370/431 |
| 6,631,128 B1 | 10/2003 | Lemieux | |
| 6,631,136 B1 | 10/2003 | Chowdhury et al. | |
| 6,847,633 B1 * | 1/2005 | Ryu et al. | 370/352 |

* cited by examiner

*Primary Examiner*—Chi H. Pham
*Assistant Examiner*—Soon D. Hyun
(74) *Attorney, Agent, or Firm*—Cindy Kaplan (57) ABSTRACT

A method and system for determining route redistribution are disclosed. The method generally comprises receiving an information packet from a neighbor source. The information packet identifies the source as a stub router and specifies route types that the source will advertise. Upon receiving notice of a failed link within the network, query packets are sent only to neighboring devices that have not been identified as stub routers to request route information.

20 Claims, 7 Drawing Sheets

METHOD AND SYSTEM FOR ROUTING COMMUNICATIONS AMONG COMPUTER NETWORKS

RELATED APPLICATION

This patent application is a continuation of U.S. patent application Ser. No. 09/627,248, filed Jul. 28, 2000, which is incorporated herein by reference in its entirety.

BACKGROUND OF THE INVENTION

The present invention relates generally to communication networks, and more specifically, to routing communications among computer networks.

Figure 1:
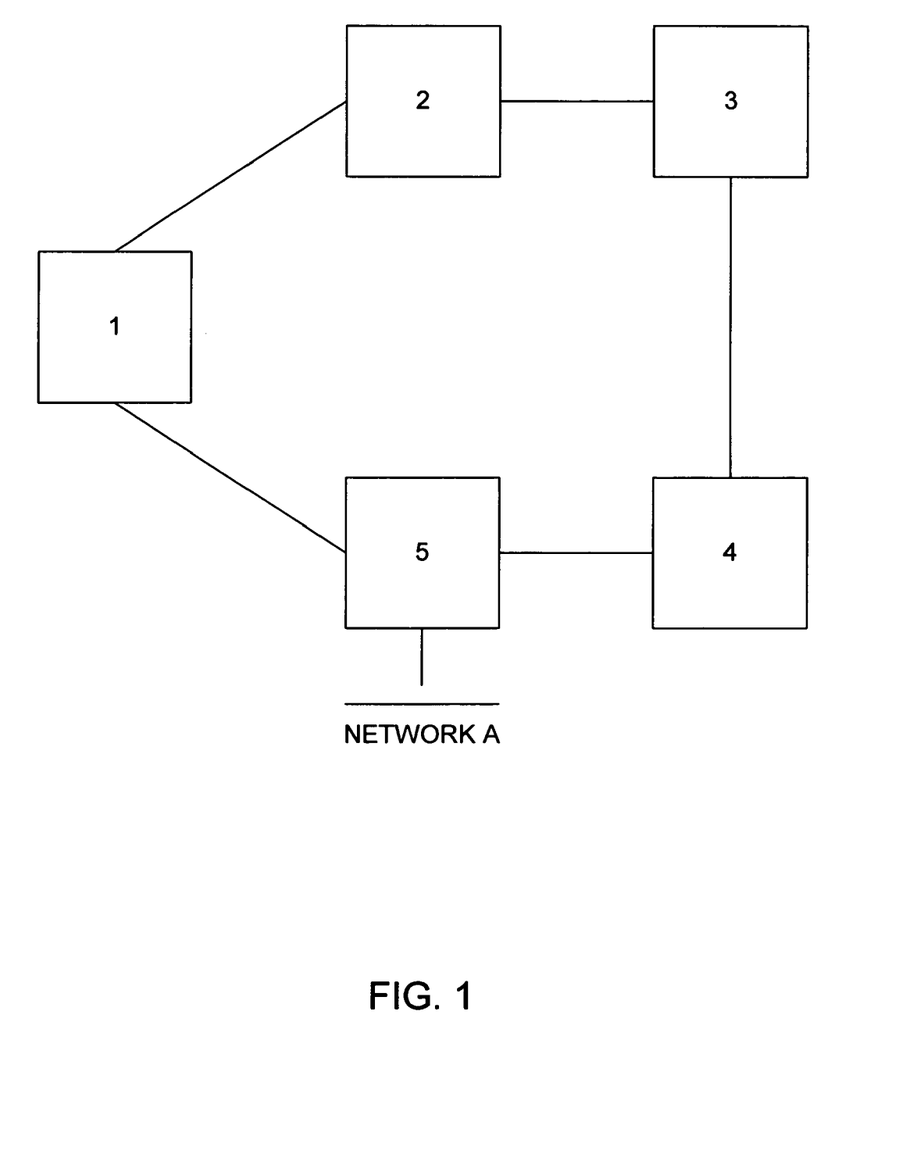
FIG. 1 is a block diagram illustrating a plurality of routers connected within a network.

Computer networks consist of a number of computer systems coupled together with a bus, rings, or other medium so that they can communicate with each other. The computer network may be interconnected with a series of gateway circuits. Each gateway identifies all destinations for which it has a direct connection with. Paths to other destinations are obtained through an interchange of routing transmissions with adjacent gateways. For each identified path, the gateway stores the identity of the gateway circuit which is the next hop on the path, and a vector of metric information describing the path. A typical distance vector protocol retains information on the distance (total metric or distance, such as hop count) and the vector (the next hop) to use when computing the best path to a destination. For example, if all the routers (1-5) in the network of FIG. 1 are running Routing Information Protocol (RIP), router 2 chooses the path to network A by examining the hop count through each available path. Since the path through router 3 (3→4→5) is three hops, and the path through router 1 (1→5) is two hops, router 2 chooses the path through router 1 and discards the information it learned through router 3. If the path between router 1 and network A goes down, router 2 loses all connectivity with this destination until it times out the route of its routing table (three update periods or 90 seconds), and router 3 re-advertises the route (which occurs every 30 seconds in RIP). Not including any hold-down time, it will take between 90 and 120 seconds for router 2 to switch the path from router 1 to router 3.

EIGRP (Enhanced Interior Gateway Routing Protocol) is a protocol that allows a number of gateways to coordinate their routing and provides an improvement over RIP. EIGRP uses distance vector routing technology so that each router need not know all the router's link relationships with the entire network. Each router advertises destinations with a corresponding distance and upon receiving the information adjusts the distance and propagates it to neighboring routers. EIGRP, instead of counting on full periodic updates to re-converge as with RIP, builds a topology table from each of its neighbor's advertisements (rather than discarding the data), and converges by either looking for a likely loop-free route in the topology table, or, if it knows of no other route, by querying its neighbors. Thus, with EIGRP, router 2 saves the information it received from both routers 1 and 3. Router 2 chooses the path through router 1 as its best path (the successor) and the path through router 3 as a loop-free path (a feasible successor). When the path through router 1 becomes unavailable, router 2 examines its topology table and, finding a feasible successor, begins using the path through router 3 immediately.

Figure 2:
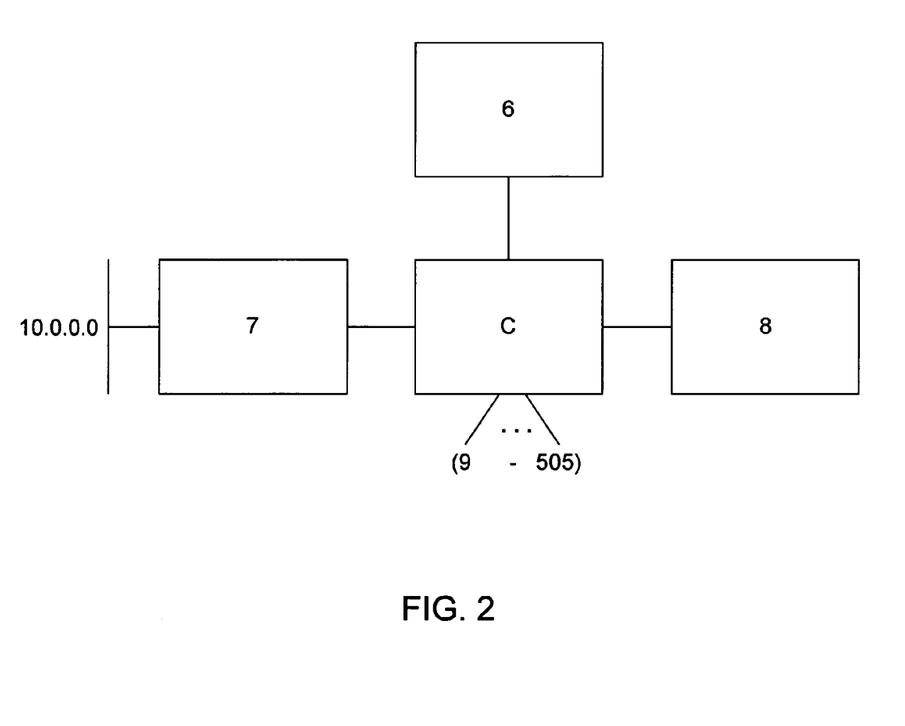
FIG. 2 is a block diagram illustrating a network configured in a hub and spoke arrangement.

One drawback to EIGRP is the impact to a router having a large number of connections, when a single connection is lost. FIG. 2 illustrates a spoke and hub arrangement with router C positioned as the hub (or core) router and routers 6, 7, and 8 positioned as spokes. Conventional systems utilizing EIGRP would have all routers configured to provide the same type and amount of route information to its neighbors. This configuration works well with a limited amount of routers. However, in a hub and spoke network with a large number of neighbors (e.g., 500), if a single spoke is lost the time required for the hub to contact all of its neighbors is excessive. For example, if a failure occurs between router C and router 6, router C will incur a spike in its load to generate 499 queries, with one query being sent to each of the remaining neighbors. Router C will also have to deal with the 499 replies as each of the routers inform router C that they have no other paths available for the router being questioned. This must be done for each of the routes learned by router 6.

There is, therefore, a need for a system and method for selectively querying a large number of neighbors when a failure in one of the network connections occurs.

SUMMARY OF THE INVENTION

A method and system for determining route redistribution are disclosed. A system for determining route redistribution at a device within a network generally comprises memory and a processor configured for receiving a hello packet containing peer information from a neighbor source. The hello packet identifies the neighbor source as a stub router and specifies route types that the neighbor source will advertise. The stub router is identified as a router to which query generation is suppressed. Query packets are requesting route information are sent only to neighboring devices that have not been identified as stub routers, upon receiving notice of a failed connection.

In another aspect of the invention, a computer system for reducing query generation for route redistribution within a network generally comprises a processor configured for receiving information at a router identifying the router as a stub router, sending an information packet from the stub router to neighboring devices, the information packet identifying the source as a stub router and specifying route types that the stub router will advertise, and sending a response packet with routes identified as inaccessible upon receiving a query for route information other than the route types specified in the information packet. The system further includes memory for storing information received by the processor.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 3:
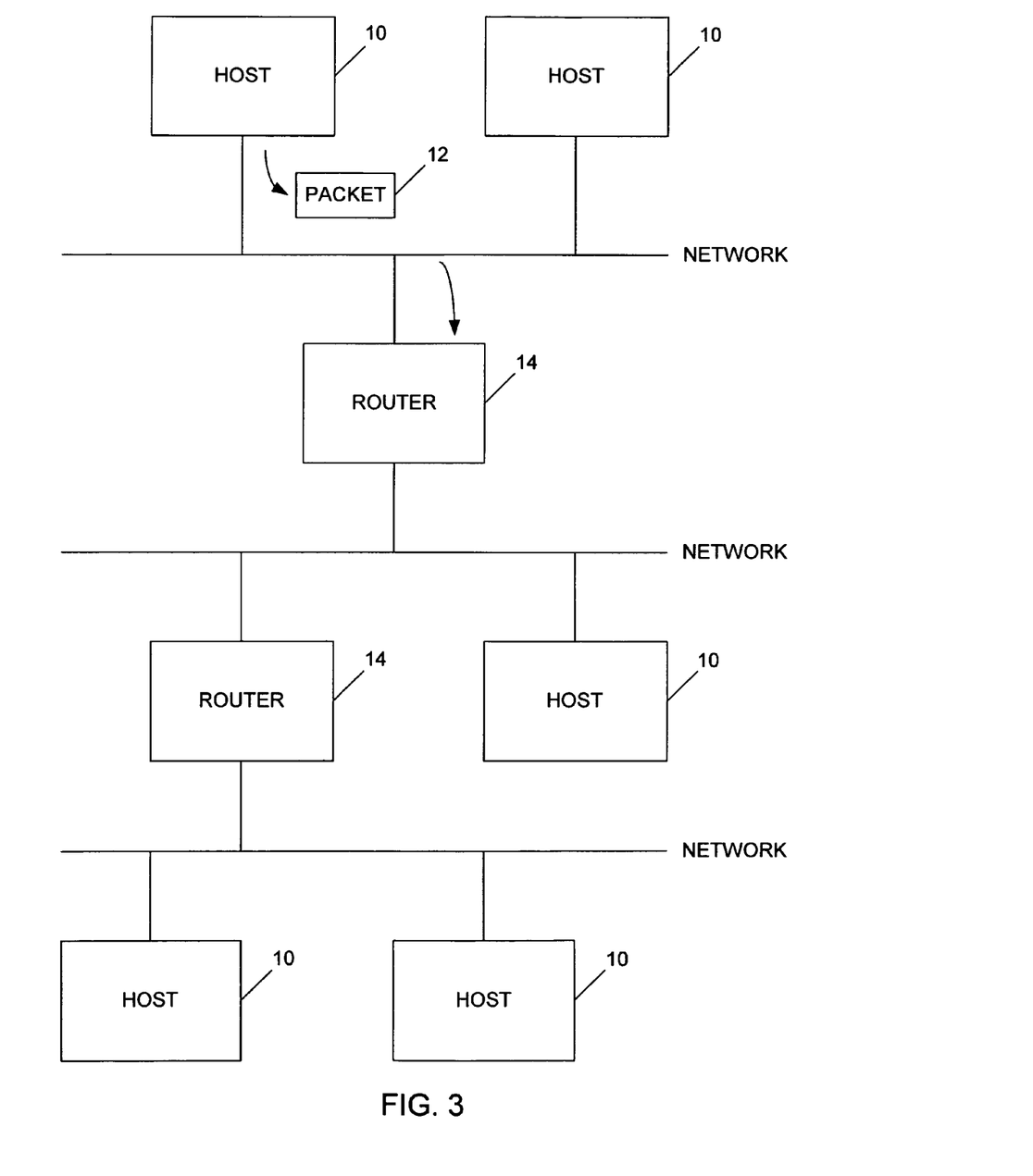
FIG. 3 is a block diagram illustrating an exemplary network environment for a routing protocol.

The present invention operates in the context of a data communication network including multiple network elements or nodes. In a preferred embodiment, the invention may be used in conjunction with a computer network environment such as that shown in FIG. 3. As those skilled in the art will recognize, the network shown in FIG. 3 is just an example and the other networks may be used. A network environment, sometimes called an internetwork, may comprise a communication network to which is coupled one or more hosts 10. Each host 10 may comprise a computer or another device which is capable of receiving a packet 12 from the network and recognizing if that message is addressed to that host. At least one host 10 is also capable of sending a packet 12 onto the network and addressing that packet for a destination. Those skilled in the art will recognize that the invention may be used with a variety of known networks, such as Ethernet, FDDI, Token Ring, and other known networks (both LAN (local area network) and WAN (wide area network)).

The network environment may comprise a plurality of networks, which may be the same kind (e.g., each network may comprise an Ethernet) or different kinds (e.g., a first network may comprise an Ethernet, while a second network may comprise a Token ring). A pair of networks may be linked by a switching device, sometimes called a bridge, gateway, or router 14. A router may comprise a switching device that can decide to which one of several networks it may route the packet. Some of the nodes of the network may be specially configured routers such as those available from Cisco Systems, Inc. of San Jose, Calif. As used herein the term router is used to refer to devices that forward packets based on network and higher layer information. The router may include, for example, a master central processing unit (CPU), interfaces, and a bus (e.g., a PCI bus). The CPU preferably includes a memory and a processor. When acting under the control of appropriate software or firmware, the CPU is responsible for such router tasks as routing table computations, network management, and general processing of packets. It preferably accomplishes all of these functions under the control of software including an operating system (e.g., a version of the Internetwork Operating System (IOS®) of Cisco Systems, Inc.) and any appropriate applications software. The CPU may include one or more processors such as a processor from the Motorola family or microprocessors of the MIPS family of microprocessors. In an alternative embodiment, the processor is specially designed hardware for controlling the operations of the router. Memory can be non-volatile RAM and/or ROM. However, there are many different ways in which memory could be coupled to the system. In an alternative embodiment, a router or switch may be implemented on a general purpose network host machine such as the computer 20 system of FIGS. 4 and 5.

Figure 4:
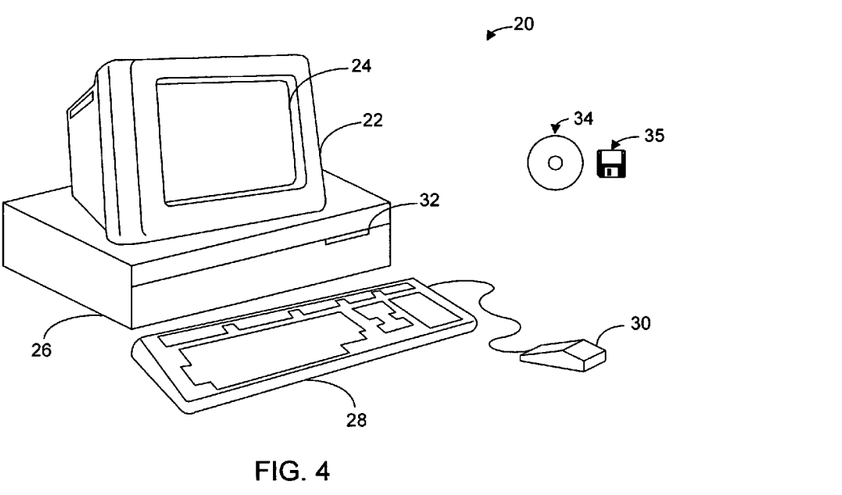
FIG. 4 is a schematic illustrating an example of a computer system that can be utilized to execute software of an embodiment of the present invention.

FIG. 4 illustrates an example of a computer system that may be used to execute software of an embodiment of the invention. The computer system 20 includes a display 22, screen 24, cabinet 26, keyboard 28, and mouse 30 which may include one or more buttons for interacting with a GUI (Graphical User Interface). Cabinet 26 houses a CD-ROM drive 32, system memory 42 and a hard drive 44 (see FIG. 5) which can be utilized to store and retrieve software programs incorporating computer code that implements aspects of the invention, data for use with the invention, and the like. Although CD-ROM 34 and floppy disk 35 are shown as exemplary computer readable storage media, other computer readable storage media including tape, flash memory, system memory, and hard drive may be utilized. Additionally, a data signal embodied in a carrier wave (e.g., in a network including the Internet) may be the computer readable storage medium.

Figure 5:
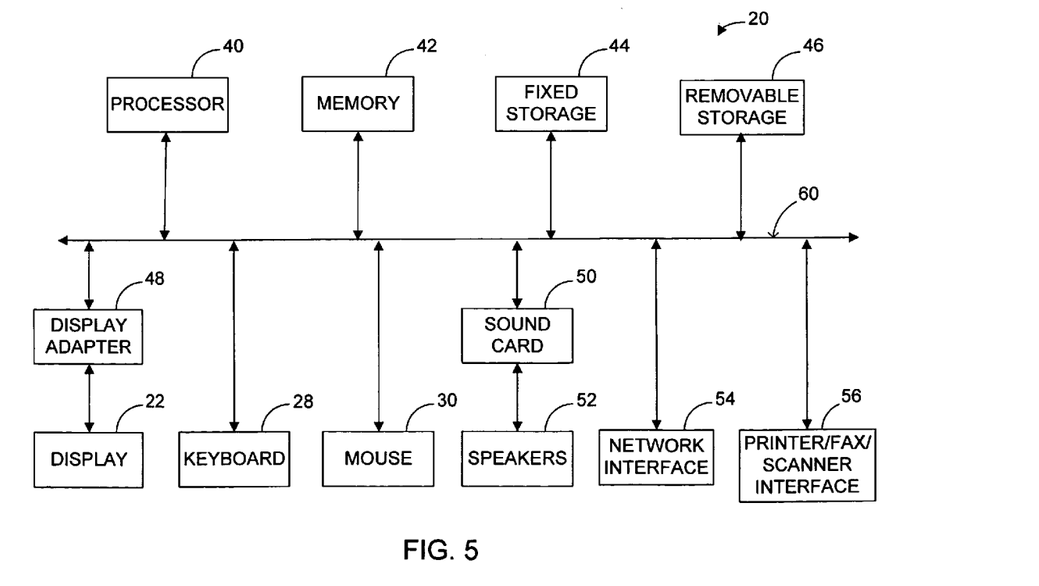
FIG. 5 is a system block diagram of the computer system of FIG. 4.

FIG. 5 shows a system block diagram of computer system 20 used to execute software of an embodiment of the invention. Computer system 20 further includes subsystems such as a central processor 40, system memory 42, fixed storage 44 (e.g., hard drive), removable storage 46 (e.g., CD-ROM drive), display adapter 48, sound card 50, transducers 52 (speakers, microphones, and the like), network interface 54, and printer/fax/scanner interface 56. Other computer systems suitable for use with the invention may include additional or fewer subsystems. For example, computer system 20 may include more than one processor 40 (i.e., a multi-processor system) or a cache memory.

The system bus architecture of computer system 20 is represented by arrows 60 in FIG. 5. However, these arrows are only illustrative of one possible interconnection scheme serving to link the subsystems. For example, a local bus may be utilized to connect the central processor 40 to the system memory 42 and display adapter 48. Computer system 20 shown in FIGS. 4 and 5 is only one example of a computer system suitable for use with the invention. Other computer architectures having different configurations of subsystems may also be utilized. Communication between computers within the network is made possible with the use of communication protocols, which govern how computers exchange information over a network.

The invention is described herein with reference to a preferred embodiment that implements EIGRP, an extension of the IGRP (also called IGRP1) routing protocol described in U.S. Pat. No. 5,088,032, which is incorporated herein by reference in its entirety. EIGRP is a protocol that allows a number of gateways to coordinate their routing. It is intended for use in gateways connecting several networks. EIGRP uses distance vector routing technology so that each router need not know all the router's link relationships of the entire network. Each router advertises destinations with a corresponding distance and upon hearing routing information adjusts the distance and propagates it to neighboring routers. EIGRP has four basic components: neighbor discovery/recovery; reliable transport protocol; DUAL finite state machine; and protocol dependent modules. Neighbor discovery/recovery is the process that routers use to dynamically learn of other routers on their directly attached networks. Routers must also discover when their neighbors become unreachable or inoperative. This process is achieved with low overhead by periodically sending small Hello packets. As long as the Hello packets are received, a router can determine that a neighbor is alive and functioning. Once this is determined, the neighboring routers can exchange routing information. The reliable transport protocol is responsible for guaranteed, ordered delivery of EIGRP packets to all neighbors. For efficiency, reliability is provided only when necessary. The DUAL finite state machine embodies the decision process for all route computations. It tracks all routes advertised by all neighbors. Details of the DUAL finite state machine are described in U.S. Pat. No. 5,519,704, which is incorporated herein by reference in its entirety. The protocol-dependent modules are responsible for network layer, protocol-specific requirements. It is to be understood that the present invention may be used with routing protocols other than EIGRP without departing from the scope of the invention.

EIGRP relies on neighbor relationships to reliably propagate routing table changes throughout the network. Two routers become neighbors when they see each other's Hello packets on a common network. Hello packets are multicast when a router is first started, to indicate that a topology update is requested. Hello packets may also be used as ack (acknowledgement) packets, and may be unicast in response to a packet that requires acknowledgement. Each Hello packet may include a sequence number to indicate that an acknowledgement is required, and an acknowledgement field, to indicate that the packet acknowledges receipt of another packet. Each packet may also include TLV (type, length, and value field) formats, to indicate particular properties of the packet or data to be transmitted with the packet. An update packet may be unicast to a specific neighbor router in response to a Hello packet. Updates are used to convey reachability of destinations. When a new neighbor is discovered, update packets are sent so that the neighbor can build its topology table. Query, reply and request packets may also be transmitted between routers. Queries and replies are sent when destinations go into active state. Queries are always multicast unless they are sent in response to a received query. In this case it is unicast back to the successor that originated the query. Replies are always sent in response to queries to indicate to the originator that it does not need to go into active state because it has feasible successors. Replies are unicast to the originator of the query. Request packets are used to get specific information from one or more neighbors. It is to be understood that information may be transmitted in formats other than the packets described herein without departing from the scope of the invention.

The present invention modifies how EIGRP or other routing protocols handle route distribution. One or more routers within the network are identified as 'stub' routers. Routers may be identified as stub routers by a network administrator, for example. Routers such as those having only one neighbor may be automatically identified as a stub router. A stub router is typically located at the physical or logical edge of a network. These routers will provide only limited route information to its neighbors. Only specified route types are redistributed by the stub routers. All queries for other route types (e.g., connected, redistributed static, summaries, internal routes, external routes) are responded to with metric inaccessible (e.g., information on a metric for the path requested is not available). A router configured as a stub may send a special information packet (e.g., peer information packet) to all of its neighbors reporting its status as such. Upon start up, in addition to the typical router information that is exchanged between routers, the stub routers will exchange peer information with its neighbors. The peer information may be transmitted with the Hello packet, for example. Included in this packet is an indication of route types that the stub router will advertise. Any neighbor receiving a peer information packet from a stub neighbor will not query that neighbor for routes. The neighboring device will depend on the stub router to send the proper updates. Any query a stub peer receives for any route information (other than the type specified in the peer packet) will be reported with metric inaccessible. With the stub feature enabled, the router will continue to honor all queries, updates, and commands, with the exception that it will mark filtered routes as inaccessible (or with other any other suitable label indicating that the requested routes are unavailable or unknown).

Normal query generation is preferably suppressed for the following cases:
  point-to-point links with the neighbor identified as a stub;
  multipoint links with a single neighbor identified as a stub; and
  multipoint links with multiple neighbors, all of which are identified as a stub.

Queries will be sent to multipoint links with mixed neighbor types (stub and nonstub) and stub neighbors will respond to the query with metric inaccessible.

The following command may be used to add this feature to EIGRP:
  [no] eigip stub [receive-only]|[[connected] [static] [summary]]

The following commands may then be used to identify the remote routers in FIG. 2 as stub routers:
  router eigrp 42
    network 10.0.0.0
  eigrp stub connected summary Routers 6 through 505 in FIG. 2 are now configured as stub routers. When a failure occurs between router C and router 6, router C will suppress the queries to routers 6 through 505 that it would normally have generated. This leaves it with no other routes available in the topology table, so it floods an update to all the remote routers informing them of the loss. This is a reduction from 1498 packets (1 update+499 queries+499 replies+499 updates) to just 500 packets (1 update+499 updates) being generated by the core router C.

In a preferred embodiment, the peer information packet includes a type bit which identifies whether a router is a stub router and a field that specifies the type of information that the router can pass to a neighboring device. For example, the stub router may be configured to provide the following types of route information:
  none;
  connected;
  summaries;
  static;
  internal;
  external; or
  any combination of the above.

Figure 6:
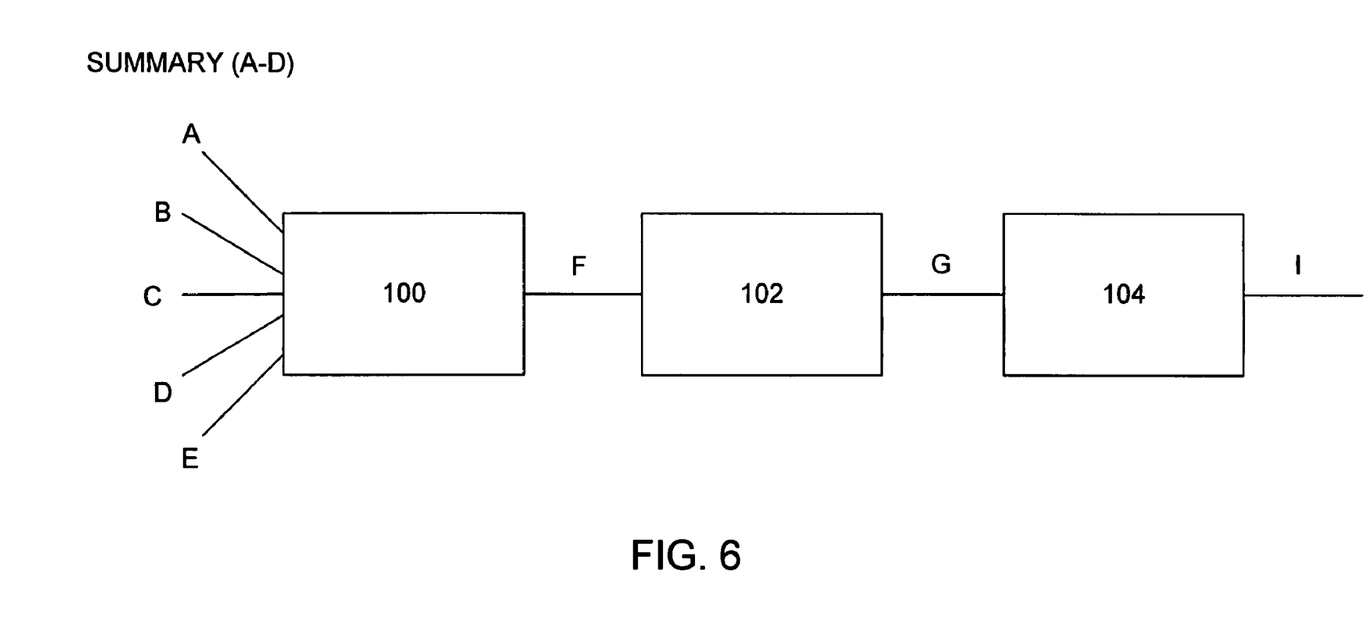
FIG. 6 is a block diagram of a portion of a network showing three routers.

If a stub router is configured only to receive, it does not provide any information regarding its other connections within the network with other neighbors. If the router is configured to provide connected information, it provides information on all connected routes. For example, FIG. 6 illustrates three routers 100, 102, and 104. Router 100 has six connections labeled A-F. Route connection F couples router 100 to router 102. Router 102 has two connections: F (between routers 100 and 102) and G (between routers 102 and 104). Router 104 is connected to routes G and I. If router 102 is identified as a connected stub router, it will only provide information on connected routes. Thus, in response to a query from router 100 or router 104, it will respond that it is connected to routes F and G. It will not provide any information on routes A-E. If router 100 is identified as a stub router that is configured to provide only summaries it will respond to a query from its neighbor that it is connected to routes A-D (assuming these routers are grouped as a summary route as indicated in FIG. 6). Thus, if router 102 asks stub router 100 about its status and router 100 is configured to provide only summaries, it will inform router 102 about summary route A-D but not connection E since this is not a summary route (i.e., E is not grouped with the other routes and identified as a summary route). The stub router may also be configured to provide both connected and summary information. The other type of route information a stub router can provide information on static routes, which exist only as part of a configuration set up rather than a physical wired connection. It is to be understood that the stub router may be configured to provide information on other types of routes or combinations of types of routes than described herein.

Figure 7:
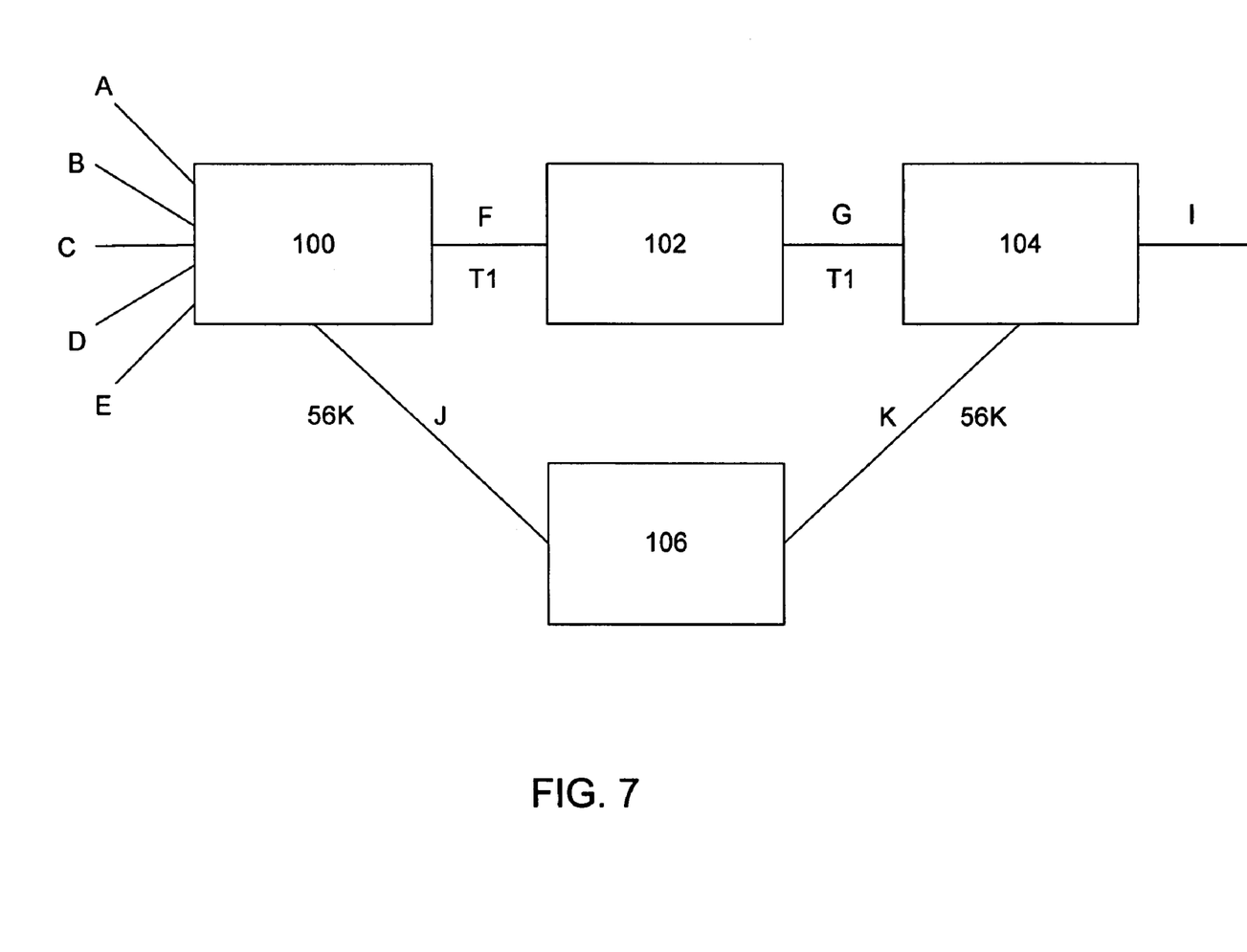
FIG. 7 is a block diagram of the portion of the network of FIG. 6 with an additional router.

A stub router may also be used to prevent traffic from being rerouted to an undesirable path. For example, FIG. 7 shows a network similar to the network of FIG. 6 except that router 106 has been added. Router 106 is connected to router 100 through route J and to router 104 through route K. If none of the routers 100, 102, 104, 106 are identified as stub routers, each router is able to tell about all related connections. Thus, if connection G goes down, router 100 will query router 106 as to how to get to connection I. Router 106 will respond and inform router 100 that it can get to connection I by going through connection K to router 104. There may be, however, situations in which it is undesirable to reroute traffic through router 106. For example, routes F and G may be T1 connections and routes J and K may be provided via a 56 k modem. In this case, it may be acceptable to send some traffic through connections J and K, but undesirable to reroute the traffic currently passing through routes F and G through routes J and K. There may also be a case where routes F and G are secure paths and J and K are unsecure paths. If connections F or G fail, the secure communications should not be rerouted to an unsecure path. To prevent traffic from being rerouted from routes F and G to routes J and K, router 106 can be configured as a stub router that provides only connection information. Router 106 will then only tell router 100 that it is connected to routes J and K. Stub routers can thus be used to eliminate back up routes that are undesirable due to bandwidth, security, or other constraints.

Figure 8:
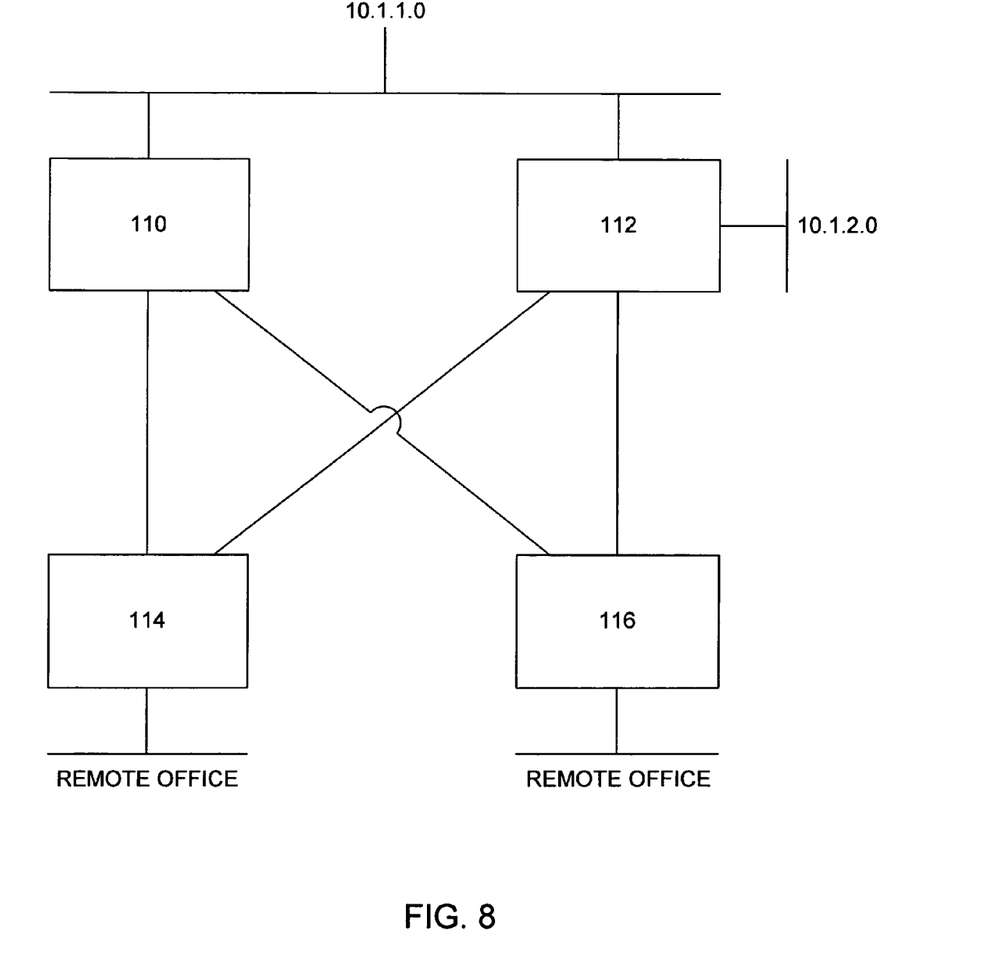
FIG. 8 is a block diagram of a dual homed network arrangement.

The invention may also be used in a network having one or more dual homed hosts or other devices as shown in FIG. 8. A dual homed host is a computer that has separate network connections to two networks. The host may have two network cards (e.g., Ethernet cards), each having an address on a separate subnet or the host may have only one Ethernet card and use aliasing. The dual homed host may be used, for example, as a gateway with one physical connection to an internal secure network and one to a non-secure network. As shown in FIG. 8, the network includes a distribution layer consisting of router 110 and router 112, and two access routers 114 and 116 connected to remote office sites. Possible paths from router 110 to network 10.1.2.0 are:

(a) router 110→router 112→10.1.2.0

(b) router 110→router 114→router 112→10.1.2.0

(c) router 110→router 116→router 112→10.1.2.0

Router 110 would normally select the best route (a) in this case to reach its destination. If the link from router 112 to 10.1.1.0 fails, router 110 would then attempt to use one of the back up routes, (b) or (c). If the links for these routes are properly sized to handle the load the back up routes would work fine. However, this is typically not the case. Most networks of this type have routers 114 and 116 located at remote offices with relatively slow links or links with load or traffic based costing. To prevent router 110 from switching to the back up routes (b) or (c), routers 114 and 116 can be configured as stub routers.

This type of dual homed arrangement may also cause instability in an EIGRP network if stub routers are not used. For example, if router 110 loses a route, it will query router 112 and router 114. Router 114 will in turn query router 112, and so on. If there are a large number of remotes tied to each of the distribution layer routers 110, 112 (especially with low speed links) the chances of over running one of the distribution layer routers with queries and losing some of the replies increases and may result in a stuck inactive (SIA) situation. The typical solution for this situation is to summarize as much as possible on the distribution layer routers 110, 112 out to the remotes 114, 116 so that the remotes no longer receive updates for the majority of routes in the network. Because of this, initial startup of the remotes 114, 116 requires the passing of minimal updates. Also the remotes 114, 116 can reply immediately to any queries from the distribution layer routers 110, 112 without being forced to query through the other distribution layer router. The major problem with this solution is the installation of an interface specific summary route in the routing table. While the summary created by the IP summary-address command is only sent out of the interfaces that the command is coded on, it is placed on the routing table, superseding any equivalent route from another source (due to superior administration distance of the local summary). This may cause malfunctions in routing, particularly in the case of the default route. This instability problem can instead be resolved by identifying remote routers 114 and 116 as stub routers, as previously described.

It will be observed from the foregoing that the method and system of the present invention provide for a reduction in router traffic to remote (stub) sites and processing load for routers in the central (core) site, thus, permitting faster route convergence and greater scalability for networks with a large numbers of remote routers.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A computer system for determining route redistribution at a device within a network, the system comprising:
   memory; and
   a processor that receives a hello packet containing peer information from a neighbor source, the hello packet identifying the neighbor source as a stub router and specifying route types that the neighbor source will advertise, wherein the stub router is identified as a router to which query generation is suppressed, and sends query packets requesting route information only to neighboring devices that have not been identified as stub routers upon receiving notice of a failed connection.

2. The computer system of claim 1 wherein the device and stub router operate with EIGRP.

3. The computer system of claim 1 wherein the network has a hub and spoke arrangement and the device is a hub router and the stub router is a spoke.

4. The computer system of claim 1 wherein the network includes a dual homed host.

5. The computer system of claim 1 wherein the route type that the source will advertise is connected routes.

6. The computer system of claim 1 wherein the route type that the source will advertise is summary routes.

7. The computer system of claim 1 wherein the route type that the source will advertise is static routes.

8. The computer system of claim 1 wherein the device and the neighboring devices have point-to-point links.

9. The computer system of claim 1 wherein the device and the neighboring devices have multipoint links.

10. The computer system of claim 9 wherein only one neighboring device is a stub router.

11. The computer system of claim 9 wherein multiple neighboring devices are stub routers.

12. The computer system of claim 1 wherein the device is a router.

13. A computer system for reducing query generation for route redistribution within a network, comprising:
   a processor that receives information at a router identifying the router as a stub router, sends an information packet from the stub router to neighboring devices, the information packet identifying the source as a stub router and specifying route types that the stub router will advertise, and sends a response packet with routes identified as inaccessible upon receiving a query for route information other than the route types specified in the information packet; and
   memory for storing information received by the processor;
   wherein the router is configured for Enhanced Interior Gateway Routing Protocol (EIGRP).

14. The computer system of claim 13 wherein the network has a hub and spoke arrangement and the stub router is a spoke.

15. The computer system of claim 13 wherein the stub router is in communication with a dual homed device.

16. The computer system of claim 13 wherein sending said information packet comprises transmitting a hello packet.

17. A computer system for determining route redistribution at a device within a network, the system comprising:
   memory; and
   a processor that receives an information packet from a neighbor source, the information packet identifying the source as a stub router and specifying route types that the source will advertise, wherein the stub router is identified as a router to which query generation is suppressed, and sends query packets requesting route information only to neighboring devices that have not been identified as stub routers upon receiving notice of a failed connection;
   wherein the device and the stub router are configured for Enhanced Interior Gateway Routing Protocol (EIGRP).

18. The computer system of claim 17 wherein the route type that the source will advertise is connected routes.

19. The computer system of claim 17 wherein the route type that the source will advertise is summary routes.

20. The computer system of claim 17 wherein the route type that the source will advertise is static routes.

* * * * *